(12) United States Patent
Kanazawa (10) Patent No.: US 6,546,830 B2
(45) Date of Patent: Apr. 15, 2003

(54) TRANSMISSION DEVICE OF FOUR-WHEEL DRIVE VEHICLE

(75) Inventor: Kazuo Kanazawa, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/951,765

(22) Filed: Sep. 13, 2001

(65) Prior Publication Data

US 2002/0066324 A1 Jun. 6, 2002

(30) Foreign Application Priority Data

Sep. 14, 2000 (JP) ........................................ 2000-280602

(51) Int. Cl.$^7$ ............................. F16H 37/06; F16H 3/08
(52) U.S. Cl. ........................................ 74/665.6; 74/333
(58) Field of Search ........................... 74/665 R, 665 F, 74/665 G, 665 GC, 329, 330, 331, 333; 180/233

(56) References Cited

U.S. PATENT DOCUMENTS 4,208,923 A * 6/1980 Ikegami .................... 74/665 G
5,123,293 A * 6/1992 Umemoto et al. ............ 74/333
5,640,882 A * 6/1997 Meuller .................... 74/333 X
5,947,218 A * 9/1999 Ishimaru ............... 74/665 G X
6,044,720 A * 4/2000 Matsufuji .................... 74/331
6,332,371 B1 * 12/2001 Ohashi et al. ................ 74/331

FOREIGN PATENT DOCUMENTS

| JP | 7-167257 | | 7/1995 | |
| JP | 362178429 A | * | 8/1997 | ................. 180/233 |

* cited by examiner

Primary Examiner—Richard M. Lorence
Assistant Examiner—Roger Pang
(74) Attorney, Agent, or Firm—McGinn & Gibb, PLLC (57) ABSTRACT

A transfer drive gear is provided at the rear end of a hollow counter shaft disposed under an input shaft. A reduction driven gear is provided at the rear end of a front drive shaft inserted in the counter shaft. The transfer drive gear and the reduction driven gear are engaged with a transfer driven gear which is integrally formed with an intermediate output shaft and a reduction drive gear. The rear end side of the intermediate output shaft is coupled with the front end side of a rear drive shaft through a torque coupling device, so that an FF based on the four-wheel drive vehicle can be formed.

13 Claims, 5 Drawing Sheets

TRANSMISSION DEVICE OF FOUR-WHEEL DRIVE VEHICLE

BACKGROUND OF THE INVENTION

The present invention relates to a transmission device of a four-wheel drive vehicle. Particularly, the present invention relates to the transmission device, in which an engine driving force is transmitted from an input shaft to a hollow counter shaft while a rotational speed is changed. The engine driving force is further transmitted to an output shaft of either one of front and rear wheels inserted in a hollow portion of the counter shaft. At that time, the engine driving force is also transmitted to an output shaft of the other one of the front and rear wheels.

Conventionally, in the case of a manual transmission vehicle for space-saving, there is generally known a structure as follows. Namely, the engine driving force is transmitted from the input shaft to the hollow counter shaft while a rotational speed is changed, and the engine driving force is transmitted from the counter shaft to the output shaft of the front (rear) wheel and to the output shaft of the rear (front) wheel disposed on the same rotation axis as the input shaft.

For example, Japanese Patent Unexamined Publication No. Hei. 7-167257 discloses a transmission device of a four-wheel drive vehicle that comprises an input shaft, a hollow counter shaft, a front wheel side output shaft, a drive gear and a driven gear. The input shaft receives the engine driving force. The hollow counter shaft is disposed in parallel to this input shaft to transmit the engine driving force for changing a rotational speed to a predetermined one. The output shaft of the front wheel is inserted in a hollow portion of the counter shaft to transmit the driving force to a final reduction gear of a front wheel. The drive gear is coaxially coupled to an end of the output shaft through a center differential device and a viscous coupling. The driven gear engages with the drive gear to change a rotation axis to the same rotation axis as the input shaft and to change the rotating shaft to the output shaft of the rear wheel However, in the foregoing structure of the prior art, the center differential device and the viscous coupling are positioned on the same rotation axis as the counter shaft, that is, at a lower portion in a transmission case, and there is a problem that gears stir oil to produce useless resistance, and fuel efficiency is deteriorated.

Besides, in an automatic transmission vehicle, a main speed change is performed on the same shaft as the input shaft of the engine driving force. Such a transfer device of the four-wheel drive vehicle, as a center differential device or a viscous coupling is also disposed on the same shaft as the input shaft of the engine driving force. However, in the prior art, since the center differential and the viscous coupling are disposed on the same rotating axis as the counter shaft, it has been difficult to use the power distribution devices of the four-wheel drive vehicle for the automatic transmission vehicle and the respective mechanisms in common.

Further, when such an existing transfer mechanism as a hydraulic coupling for distributing the power between the front wheel and the rear wheel is adopted, an extensive change of layout is necessary for disposing at the same rotating axis as the counter shaft, and there is a problem that it requires a long development term.

SUMMARY OF THE INVENTION

The invention has been made in view of the above circumstances. An object is to provide a transmission device of a four-wheel drive vehicle in which the improvement of fuel efficiency caused by the lowering of stir resistance of oil can be easily realized with space saving. Further, it is also an object of the invention that a power distribution device of an automatic transmission can be used in common. Moreover, it is also an object of the present invention to easily adopt various existing transfer mechanisms and shorten a development term.

The above-mentioned object can be achieved by, according to a first aspect of the present invention, a transmission device of a four-wheel drive vehicle, comprising:

an input shaft connected to an engine for transmitting a driving force;

a hollow counter shaft extended in parallel to the input shaft;

shift gear trains provided between the input shaft and the hollow counter shaft;

a first output shaft disposed in a hollow portion of the counter shaft, for transmitting the driving force to a final reduction gear of one of front and rear wheels;

a first drive gear disposed at an end portion of the counter shaft;

a first driven gear engaging with the first drive gear and rotating about a rotating axis of the input shaft;

a second drive gear rotated integrally with the first driven gear about the rotating axis of the input shaft;

a second driven gear disposed at a base end side of the first output shaft and engaging with the second drive gear; and a second output shaft coupled with the second drive gear through a variable mechanism to transmit the driving force to a final reduction gear of the other one of the front and rear wheels.

The above-mentioned object can be achieved by, according to a second aspect of the present invention, a transmission device of a four-wheel drive vehicle, comprising:

an input shaft connected to an engine for transmitting a driving force;

a hollow counter shaft extended in parallel to the input shaft;

shift gear trains provided between the input shaft and the hollow counter shaft;

a first output shaft disposed in a hollow portion of the counter shaft, for transmitting the driving force to a final reduction gear of one of front and rear wheels;

a first drive gear disposed at an end portion of the counter shaft;

a first driven gear engaging with the first drive gear and rotating about a rotating axis of the input shaft;

a second drive gear rotated about the rotating axis of the input shaft and coupled with the first driven gear through a variable mechanism;

a second driven gear disposed at a base end side of the first output shaft and engaging with the second drive gear; and a second output shaft rotated about the rotating axis of the input shaft and coupled with the first driven gear to transmit the driving force to a final reduction gear of the other one of the front and rear wheels.

Further, in these transmission device of a four-wheel drive vehicle according to the first and second aspects of the invention, it is preferable that the first output shaft transmits the driving force to the final reduction gear of the front wheel, and the second output shaft transmits the driving force to the final reduction gear of the rear wheel.

Further, in the above-mentioned structure according to the first and second aspects of the invention, it is advantageous to further comprises:

a partition wall for shutting off infiltration of an oil between a first space at a first side having the input shaft and a second space at a second side having the first drive gear.

Moreover, in the above-mentioned structure according to the first and second aspects of the invention, it is also advantageous that the variable mechanism is a viscous-coupling or a hydraulic multiple disk clutch.

In addition, in the above-mentioned structure according to the first and second aspects of the invention, it is also preferable to further comprises:

an engine-driven oil pump for generating a hydraulic pressure to operate the hydraulic multiple disk clutch.

Further, in the above-mentioned structure according to the first and second aspects of the invention, it is further preferable that the engine-driven oil pump is disposed at the partition wall.

That is, in the transmission device of the four-wheel drive vehicle according to the first aspect of the invention, the engine driving force is first transmitted to the input shaft, and is transmitted from the input shaft to the hollow counter shaft disposed under and in parallel to that while the speed is changed to the predetermined one. Next, the driving force is transmitted from the first drive gear disposed at the end portion of the counter shaft to the first driven gear for shifting the rotating axis of the counter shaft to the rotating axis of the input shaft. Then, the driving force is transmitted to the first output shaft inserted in the hollow portion of the counter shaft that transmits the driving force to the final reduction gear of either one of front and rear wheels through the second drive gear having the rotating shaft disposed integrally with the first driven gear and the second driven gear disposed at the base end side of the first output shaft. Besides, the driving force is transmitted from the rotating shaft of the second drive gear through the torque transmission capacity variable means to the second output shaft for transmitting the driving force to a final reduction gear of the other of front and rear wheels. In this way, by adding the pair of gears, the variable means is disposed above the input shaft for the space-saving, so that the improvement of fuel efficiency caused by the lowering of the stirring resistance of the lubrication oil can be realized. Besides, since the variable means is disposed above the input shaft, it becomes possible to use the automatic transmission of the power distribution device in common, and further, various existing transfer mechanisms can be easily adopted, and a development period can be shortened.

With the transmission device of the four-wheel drive vehicle according to the second aspect of the invention, the engine driving force is first transmitted to the input shaft, and is transmitted from the input shaft to the hollow counter shaft disposed in parallel to that while the rotational speed is changed to the predetermined one. Next, the driving force is transmitted from the first drive gear disposed at the end portion of the counter shaft to the first driven gear for shifting the rotating axis of the counter shaft to the rotating axis of the input shaft. Then, the driving force is transmitted to the second output shaft coupled with the rotating axis of the first driven gear, and is transmitted to the final reduction gear of the other of the front and rear wheels. Besides, the driving force is transmitted from the first driven gear through the variable means to the second drive gear coupled on the same rotating axis, and the second driven gear is rotated by the rotation of the second drive gear, and the first output shaft inserted in the hollow portion of the counter shaft is rotated, so that the driving force is transmitted to the final reduction gear of the either one of front and rear wheels. In this way, by adding the pair of the gears, the variable means is disposed above the input shaft for the space-saving, so that the improvement of fuel efficiency caused by the lowering of stir resistance of oil can be realized. Besides, since the variable means is disposed above the input shaft, it becomes possible to use the automatic transmission of the power distribution device in common, and further, various existing transfer mechanisms can be easily adopted, and a development period can be shortened.

In the above-mentioned transmission device of the four-wheel drive vehicle, when the partition wall is provided for shutting off the infiltration of the oil between the space at the side having the input shaft and the space at the side having the first drive gear, the oil in the space at the side having the input shaft and the oil in the space at the side having the first drive gear can be made different from each other. Accordingly, it becomes possible to easily adopt an optimum oil especially for the torque transmission capacity variable mechanism.

In the above-mentioned transmission device of the four-wheel drive vehicle, in the case where the variable means is the hydraulic multiple disk clutch, when the engine-driven oil pump body for generating the hydraulic pressure for operating the hydraulic multiple disk clutch is provided at the partition wall, the structure of an oil seal becomes simple.

DETAILED DESCRIPTION OF THE PREFERRED EMBODIMENTS

Figure 1:
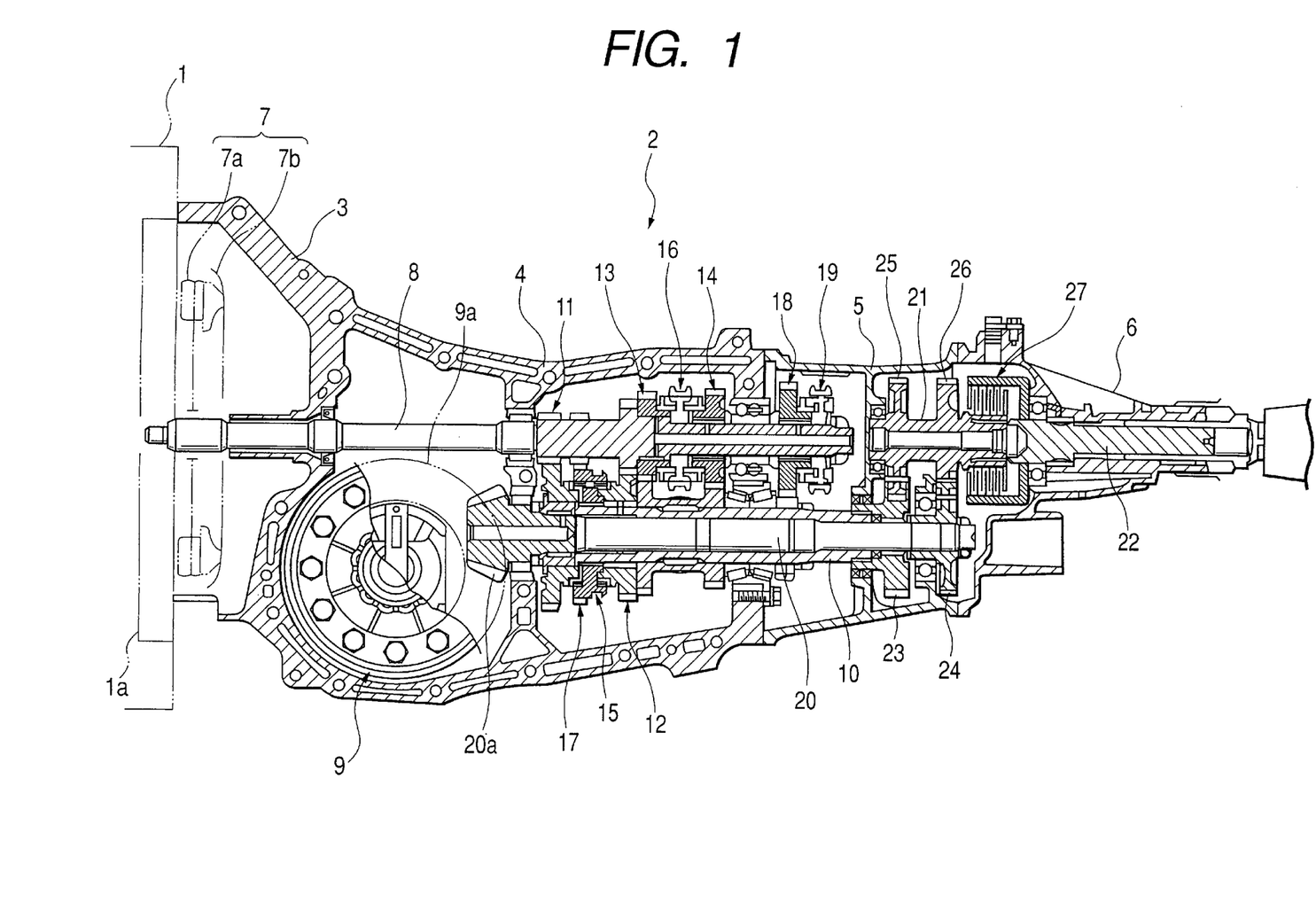
FIG. 1 is a sectional view for explaining an entire transmission according to a first embodiment of the invention.
Figure 2:
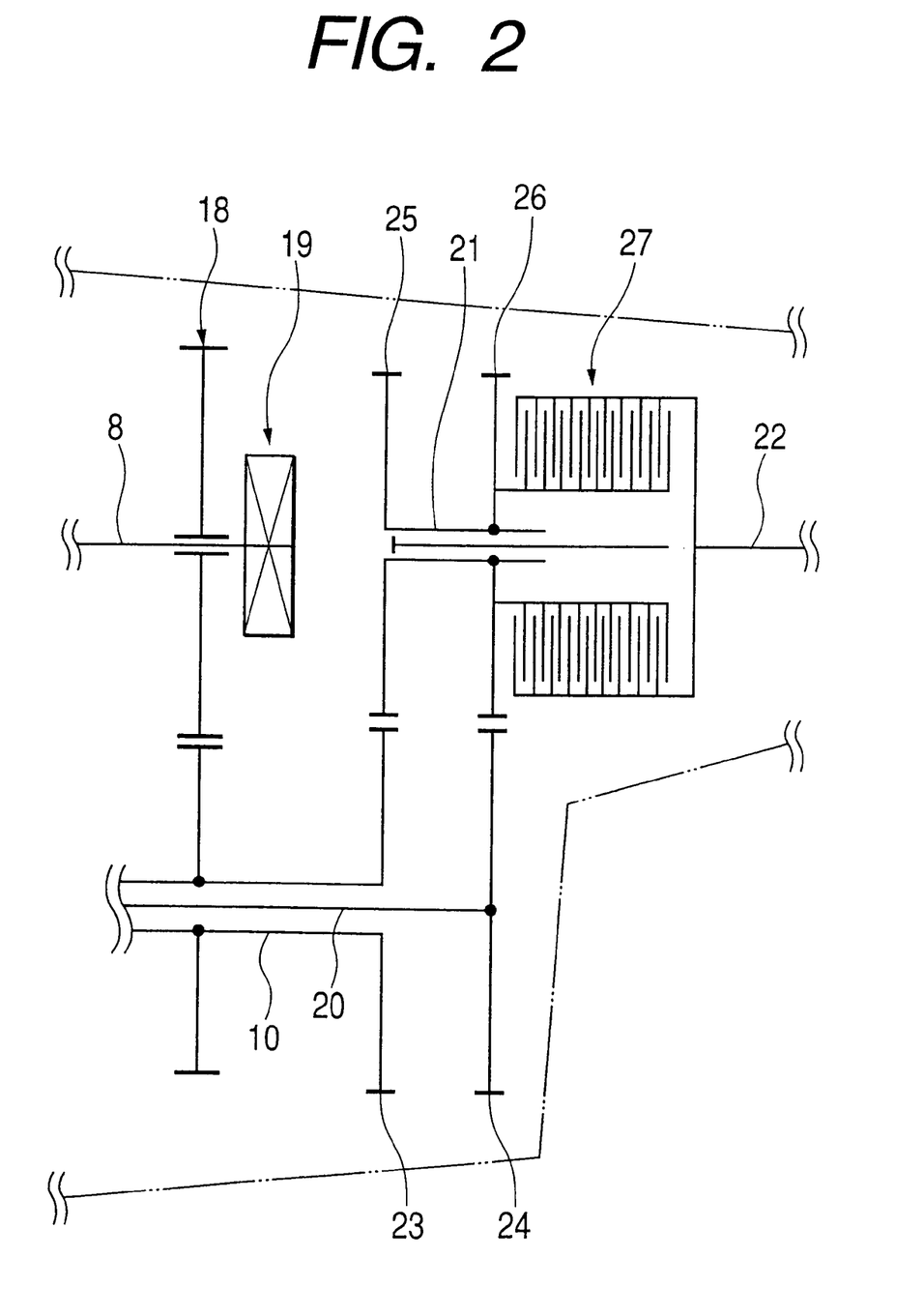
FIG. 2 is a schematic view showing a transfer portion in FIG. 1.

Hereinafter, embodiments of the invention will be described with reference to the drawings. FIGS. 1 and 2 relate to a first embodiment of the invention, FIG. 1 is a sectional view for explaining an entire transmission, and FIG. 2 is a schematic view showing a transfer portion.

In these drawings, reference numeral 1 designates an engine; and 2, a manual transmission coupled with the rear of the engine 1. A gearbox case 4 is integrally formed behind a clutch housing 3 of the manual transmission 2, and a transfer case 5 is coupled with a rear side of the gearbox case 4, and further, an extension case 6 is sequentially coupled with the rear of the transfer case 5.

A start clutch 7 constituted by a clutch disk 7a, a clutch cover 7b is disposed in the clutch housing 2, and a flywheel 1a of the engine 1 is coupled with an input shaft 8 of the manual transmission 2 through the start clutch 7. In this way, the input shaft 8 is positioned on the same axis as a not-shown crank shaft of the engine 1.

The input shaft 8 is provided in such a manner that it passes through the inside of the gearbox case 4. The rear end of the input shaft 8 protrudes into the transfer case 5. A final reduction gear 9 of a front wheel is disposed under the input shaft 8 at a front position. A hollow counter shaft 10 is disposed behind the final reduction gear 9 of the front wheel and in parallel to the input shaft 8.

In the inside of the gearbox case 4, between the input shaft 8 and the counter shaft 10, a first-speed gear train 11, a second-speed gear train 12, a third-speed gear train 13, and a fourth-speed gear train 14 are sequentially disposed from the front, and synchro mechanisms 15 and 16 are respectively provided between the two gears. Besides, a reverse gear train 17 is disposed between the first-speed gear train 11 and the second-speed gear train 12. Further, in the inside of the transfer case 5, a fifth-speed gear train 18 and a synchro mechanism 19 are disposed between the input shaft 8 and the counter shaft 10. Such a structure is made that the above three synchro mechanisms 15, 16 and 19 are selectively operated to make a shift to any one of the five forward speeds, and a shift is freely made into reverse by the engagement of the reverse gear train 17.

A front drive shaft 20 as one of the output shaft is inserted in the inside of the counter shaft 10, and behind the input shaft 8, an intermediate output shaft 21 is disposed coaxially with the input shaft 8. A drive pinion gear 20a engaging with a hypoid driven gear 9a of the final reduction gear 9 of the front wheel is provided at the front end of the front drive shaft 20. Besides, behind the intermediate output shaft 21, a rear drive shaft 22 for transmitting the driving force to a final reduction gear (not shown) of a rear wheel through a propeller shaft is disposed as the other output shaft coaxially with the intermediate output shaft 21.

A transfer drive gear 23 as a first drive gear is provided behind the rear end of the counter shaft 10, and a reduction driven gear 24 as a second driven gear is provided behind the rear end of the front drive shaft 20. The transfer drive gear 23 and the reduction driven gear 24 are engaged with a transfer driven gear 25 as a first driven gear integrally formed with the intermediate output shaft 21, and a reduction drive gear 26 as a second drive gear.

The rear end side of the intermediate output shaft 21 is coupled with the front end of the rear drive shaft 22 through a torque coupling device 27, such as a viscous coupling. The torque coupling device 27 acts as a variable means constituting the main portion of a center differential device. Thereby, a front engine-front drive (FF) based four-wheel drive vehicle can be formed.

In the first embodiment constituted as described above, when the start clutch 7 is coupled, the driving force from the engine 1 is transmitted to the input shaft 8, and is transmitted from the input shaft 8 to the counter shaft 10 while the speed is changed to any one of the five forward speeds and the one backward speed.

The driving force transmitted to the counter shaft 10 is transmitted to the intermediate output shaft 21 through the transfer drive gear 23 and the transfer driven gear 25 while the rotating axis is shifted onto the same axis as the input shaft 8.

Then, the driving force is transmitted from the intermediate output shaft 21 through the reduction drive gear 26 and the reduction driven gear 24 to the front drive gear 20. The driving force is further transmitted to the final reduction gear 9 of the front wheel. At that time, the driving force is also transmitted from the intermediate output shaft 21 through the torque coupling device 27 to the rear drive shaft 22 and the driving force is transmitted to a not-shown final reduction gear of the rear wheel. Accordingly, a front engine-front drive (FF) based four-wheel drive running is made.

According to the first embodiment, by adding the transfer drive gear 23 and the transfer driven gear 25, the torque coupling device 27 is shifted to the same axis as the input shaft 8 and is arranged for space-saving, so that the improvement of fuel efficiency caused by the lowering of stirring resistance of the transmission lubrication oil is realized. Besides, since the torque coupling device 27 is disposed above the input shaft 8 with respect to the power distribution device, it also becomes possible to use the automatic transmission in common, and further, various existing transfer mechanisms can be easily adopted, so that a development time period can be shortened.

Figure 3:
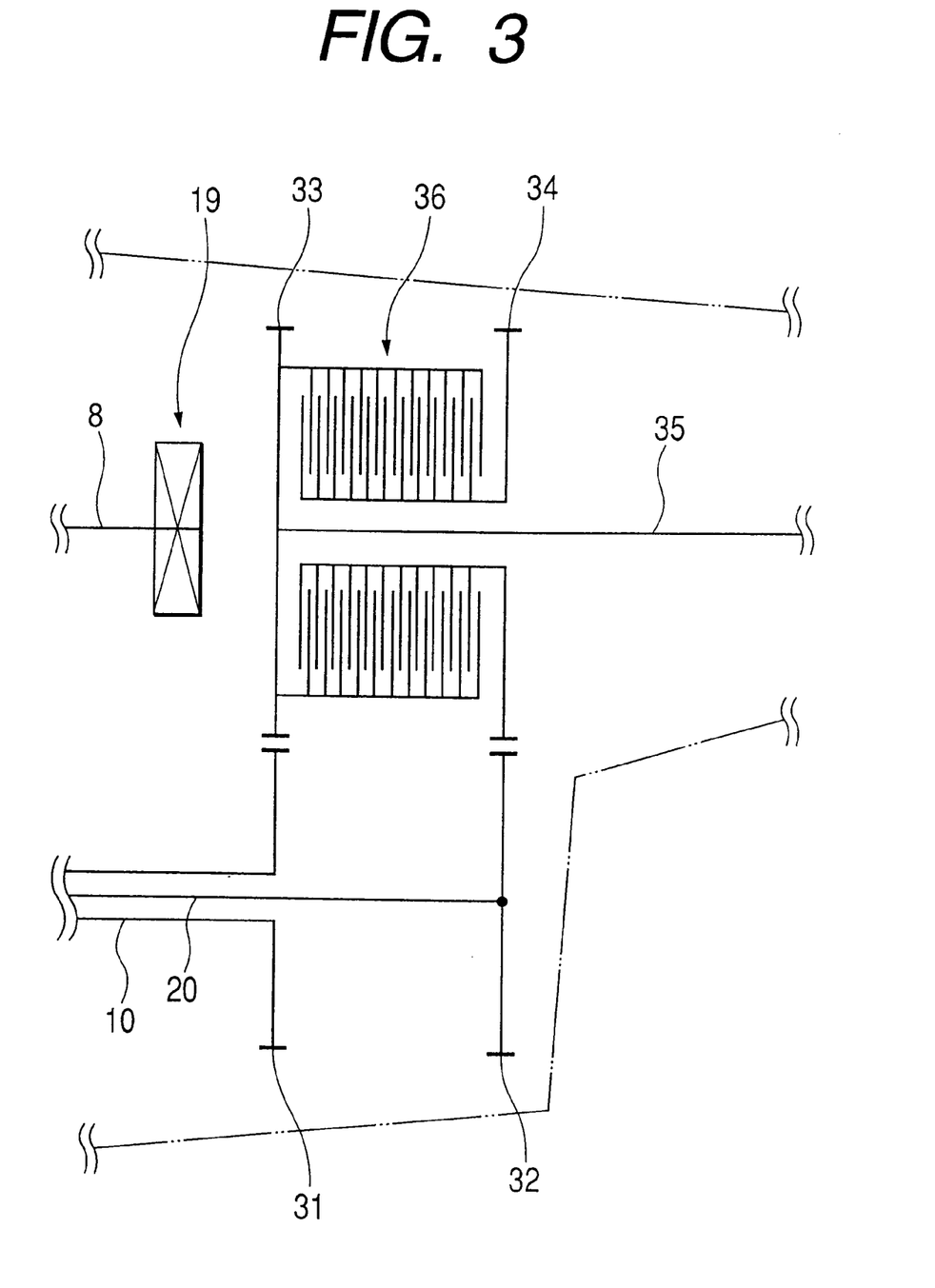
FIG. 3 is the schematic view showing a transfer portion according to a second embodiment of the invention.

Next, FIG. 3 is a schematic view showing a transfer portion according to a second embodiment of the invention. In the second embodiment, the invention is applied to a front engine-rear drive based four-wheel drive vehicle, and only portions different from the first embodiment will be described in detail with reference to the schematic view, and the description of the other portions will be omitted since these are similar to the first embodiment.

That is, a transfer drive gear 31 as a first drive gear is provided at the rear end of a counter shaft 10, and a reduction driven gear 32 as a second driven gear is provided at the rear end of a front drive shaft 20. The transfer drive gear 31 and the reduction driven gear 32 are engaged with a transfer driven gear 33 as a, first driven gear on the same rotating axis and a reduction drive gear 34 as a second drive gear.

The transfer driven gear 33 as the other output shaft is connected to the front end of a rear drive shaft 35 for transmitting the driving force through a propeller shaft to a final reduction gear (not shown) of the rear wheel. Besides, the transfer driven gear 33 is coupled with the reduction gear 34 through a torque coupling device 36, such as the viscous coupling, as the variable means constituting the main portion of the center differential device, and a front engine-rear drive (FR) based four-wheel drive vehicle is constructed.

In the second embodiment constituted as described above, when the start clutch 7 is coupled, the driving force from the engine 1 is transmitted to the input shaft 8 and is transmitted from the input shaft 8 to the counter shaft 10 while the speed is changed to any one of five forward speeds and one backward speed.

The driving force transmitted to the counter shaft 10 is transmitted to the rear drive shaft 35 through the transfer drive gear 31 and the transfer driven gear 33, and is transmitted to the final reduction gear (not shown) of the rear wheel from the rear drive shaft 35 through the propeller shaft.

Besides, the driving force is also transmitted from the transfer driven gear 33 to the reduction drive gear 34 through the torque coupling device 36. The driving force is transmitted to the final reduction gear 9 of the front wheel through the reduction driven gear 32 and the front drive shaft 20 so that a front engine-rear drive (FR) based four-wheel drive running is made.

According to the second embodiment, by adding the transfer drive gear 31 and the transfer driven gear 33, the torque coupling device 36 is shifted onto the same axis as the input shaft 8 and is arranged, so that the improvement of fuel efficiency caused by the lowering of stirring resistance of the transmission lubrication oil can be realized. Besides, since the torque coupling device 36 is disposed above the input shaft 8, with respect to the power distribution device, it also becomes possible to use the automatic transmission in common, and further, various existing transfer mechanisms can be easily adopted, and a development time period can be shortened.

Figure 4:
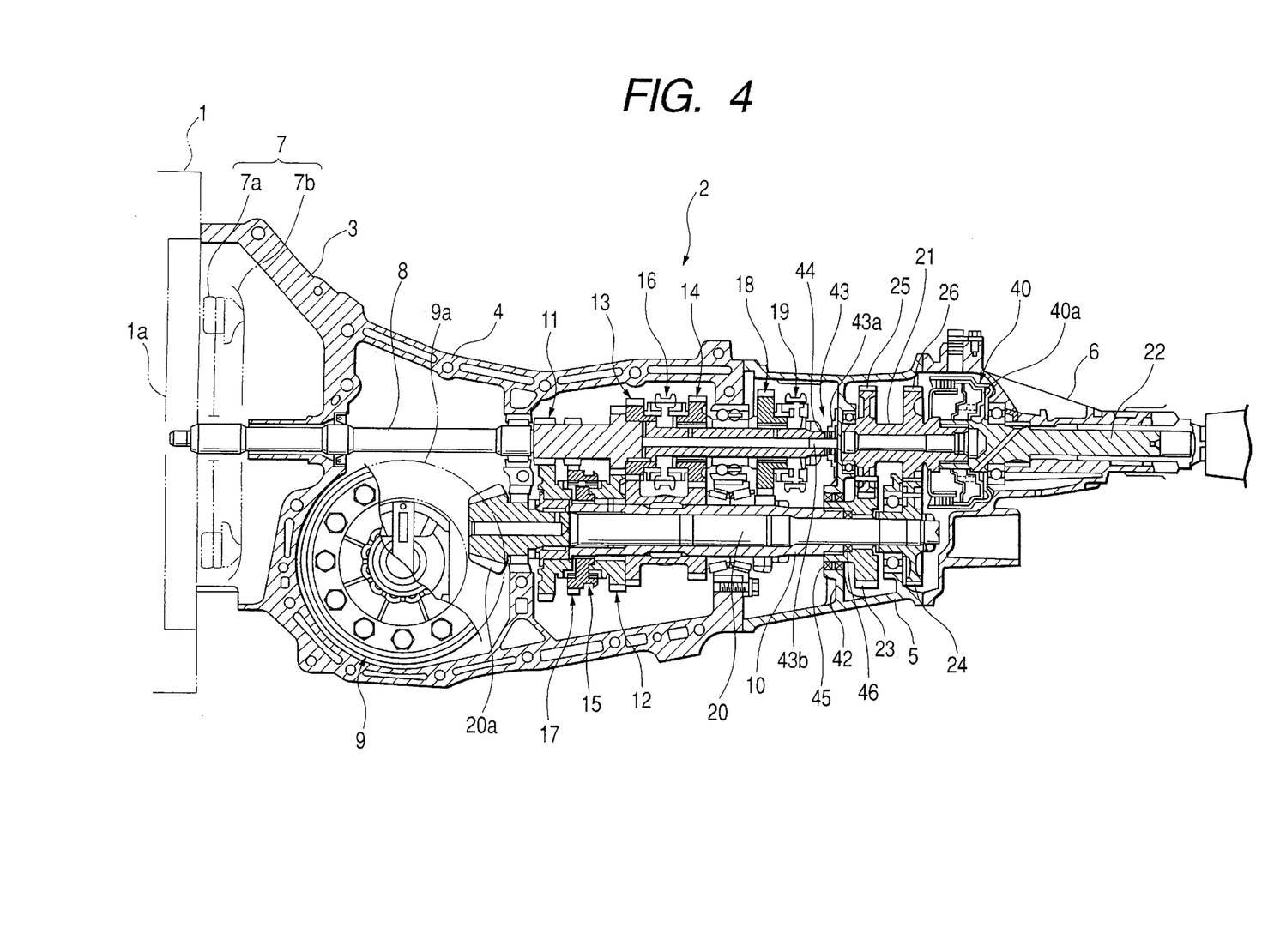
FIG. 4 is a sectional view for explaining an entire transmission structure according to a third embodiment of the invention.
Figure 5:
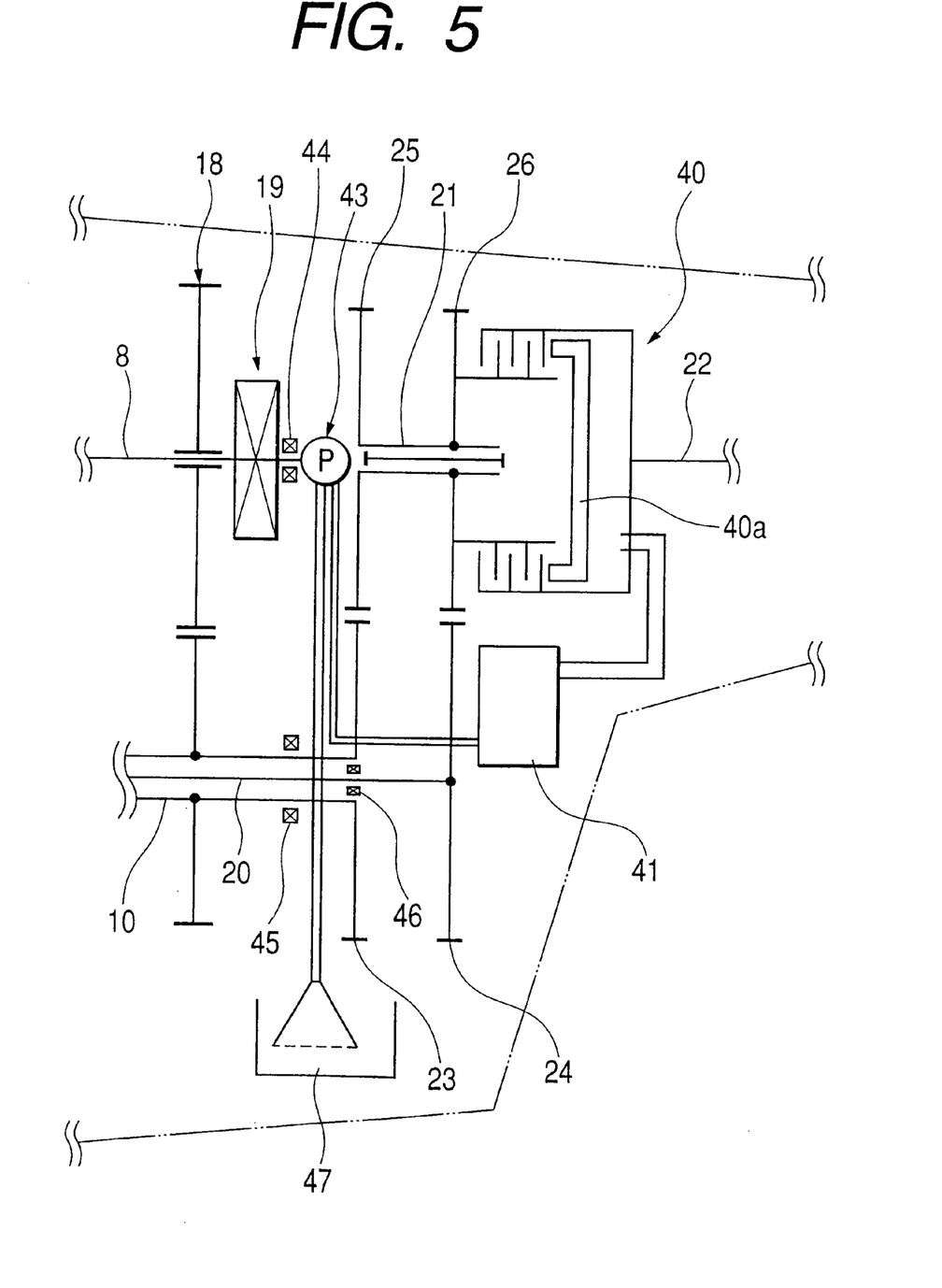
FIG. 5 is a schematic view showing the transfer portion in FIG. 4.

Next, FIG. 4 and FIG. 5 show a third embodiment of the present invention, FIG. 4 is a sectional view for explaining the entire transmission, and FIG. 5 is the schematic view showing the transfer portion. In the third embodiment of the present invention, the torque coupling-type device of the first embodiment is replaced with a wet hydraulic multiple disk clutch in which fastening force is varied in accordance with the movement state of the vehicle. In addition, in the third embodiment, incorporated is an oil pump for applying an operation oil pressure to the hydraulic multiple disk clutch. However, the other structure of the third embodiment is the same as the first embodiment, and the same portions are designated by the same characters and their description is omitted.

That is, the rear end side of an intermediate output shaft 21 is coupled with the front end side of a rear drive shaft 22 through a wet-type hydraulic multiple disk clutch (transfer clutch) 40 as the variable means constituting the main portion of a center differential device. Accordingly, the front engine-front drive (FF) based on the four-wheel drive vehicle is constructed. The transfer clutch 40 controls a duty solenoid provided inside or outside a manual transmission 2, an oil pressure control device 41 of a control valve by a not-shown control device in accordance with the movement state of the vehicle, and a piston 40a is operated.

Besides, between the rear end of an input shaft 8 and the intermediate output shaft 21, a partition wall 42 for shutting off a space at a side of the input shaft 8 and the space at the side of the intermediate output shaft 21 is formed in a transfer case 5. By the partition wall 42, the front end of the intermediate output shaft 21 is rotatably supported through bearings, and a shaft portion of a transfer drive gear 23 is inserted in a hole formed in the partition wall 42. Further, a pump casing 43a of an oil pump 43 for applying the operation oil pressure to the transfer clutch 40 is attached to the partition wall 42 at the side of the input shaft 8 by using the plane of the partition wall 42. A pump rotating shaft 43b extending from the rear end of the input shaft 8 is inserted in the pump casing 43a and is coupled with a not-shown inner rotor in the pump casing 43a.

The pump casing 43a and the pump rotating shaft 43b are sealed with an oil seal 44. The partition wall 42 and the shaft portion of the transfer drive gear 23 are sealed with an oil seal 45. The counter shaft 10 and the front drive shaft 20 are sealed with an oil seal 46 at the front side of the transfer drive gear 23. Shutted off is yhe infiltration of oil between the space at the side of the input shaft 8 and the space at the side of the intermediate output shaft 21 is shut off. Incidentally, in FIG. 5, reference numeral 47 designates a strainer.

By constituting in this way, the same effect as the effect of the first embodiment can be obtained, and it becomes possible to easily change the specification to make fine control in accordance with the movement state of the vehicle by applying the hydraulic multiple disk clutch 40.

Besides, in general, in the case where a hydraulic control system such as the hydraulic multiple disk clutch 40 is used, the operation oil in which a viscosity change due to a temperature change is slight, such as ATF (Automatic Transmission Fluid), is used. However, the manual transmission has a bevel gear, generally, the hypoid gear, a transmission oil which is excellent for using in extreme pressure performance must be used. Thus, it is necessary that the transfer portion is made a chamber separate from a transmission body. Here, the engine must drive the oil pump as an oil pressure source, and the oil pump 43 uses the oil for the hydraulic control system, such as the ATF, so that sealing becomes complicated.

Thus, as shown in the third embodiment, when sealing with the respective oil seals 44, 45 and 46 is made by using the partition wall 42, it becomes possible to easily make 4WD without changing the main transmission side at the side of the input shaft 8. Besides, when the duty solenoid accompanying with the hydraulic control system, the hydraulic control device 41 of the control valve, and the strainer 47 are effectively arranged in, for example, the space behind the front drive shaft 20, further the space-saving can be realized.

Note that although the above-mentioned embodiments according to the present invention are separately explained, it is possible for a person skill in the art to combine or utilize a main portion of one of embodiments to the other.

While there has been described in connection with the preferred embodiment of the invention, various changes and modifications may be made therein without departing from the invention, and it is aimed, therefore, to cover in the appended claim all such changes and modifications as fall within the true spirit and scope of the invention.

As described above, according to the invention, there are such excellent effects that the improvement of fuel efficiency caused by the lowering of stirring resistance of the oil can be easily realized and with space saving. In addition, it becomes possible to use a power distribution device of the automatic transmission in common. Further, various existing transfer mechanisms can be easily adopted, and a development time period can be shortened.

What is claimed is:

1. A transmission device of a four-wheel drive vehicle, comprising:
   an input shaft connected to an engine for transmitting a driving force;
   a hollow counter shaft extended in parallel to said input shaft;
   shift gear trains provided between said input shaft and said hollow counter shaft;
   a first output shaft disposed in a hollow portion of said counter shaft for transmitting the driving force to a final reduction gear of one of front and rear wheels;
   a first drive gear disposed at an end portion of said counter shaft;
   a first driven gear engaging with said first drive gear and rotating about a rotating axis of said input shaft;
   a second drive gear rotated integrally with the first driven gear about the rotating axis of said input shaft;
   a second driven gear disposed at a base end side of the first output shaft and engaging with said second drive gear; and
   a second output shaft coupled with said second drive gear through a variable mechanism to transmit the driving force to a final reduction gear of the other one of the front and rear wheels.

2. The transmission device according to claim 1, wherein said first output shaft transmits the driving force to the final reduction gear of the front wheel, and said second output shaft transmits the driving force to the final reduction gear of the rear wheel.

3. The transmission device according claim 1, further comprising:
   a partition wall for shutting off infiltration of an oil between a first space at a first side having the input shaft and a second space at a second side having the first drive gear.

4. The transmission device according to claim 1, wherein the variable mechanism comprises a viscous-coupling.

5. The transmission device according to claim 1, wherein the variable mechanism comprises a hydraulic multiple disk clutch.

6. The transmission device according to claim 5, further comprising:

an engine-driven oil pump for generating a hydraulic pressure to operate the hydraulic multiple disk clutch.

7. The transmission device according to claim 3, wherein the variable mechanism comprises:

a hydraulic multiple disk clutch; and an engine-driven oil pump disposed at the partition wall for generating hydraulic pressure to operate the hydraulic multiple disk clutch.

8. A manual transmission device mounted on a four wheel drive vehicle and housed in a transmission case, having an input shaft connected to an engine for transmitting a driving force thereof to either one of final reduction gears via front and rear output shafts, said device comprising:

a hollow counter shaft provided under said input shaft in parallel with thereof for transmitting said driving force;

a shift gear train provided between said input shaft and said hollow counter shaft for changing a relative speed therebetween;

a first output shaft mechanically and rotatably inserted in said hollow counter shaft for transmitting said driving force to either one of said final reduction gears;

a first drive gear fixedly provided at an end portion of said counter shaft;

a first driven gear approximately coaxially provided behind said input shaft for engaging said first drive gear, a rotating axis of said hollow counter shaft being displaced from said input shaft;

a second drive gear integrally formed with said first driven gear;

a second driven gear coaxially provided at a base end portion of said first output shaft for meshing with said second drive gear;

torque transmitting capacity variable means provided at a rear side of said second drive gear for changing a transmitting rate of said driving force between said formal reduction gear and said input shaft; and a second output shaft coupled with said second drive gear for transmitting said driving force to said final reduction gear so as to effectively improve a fuel consumption economy by decreasing a stirring resistance force of a lubricating oil contained in said transmission case by raising a level of said lubricating oil therein while in operation and to largely shorten a developing period by using common parts of other various kinds of transfer mechanisms.

9. The transmission device according to claim 8, wherein:

said first output shaft transmits said driving force to said front reduction gear.

10. The transmission device according claim 8, comprising:

a transfer case portion integrally formed behind said transmission case and separated by a partition wall therefrom for including said first drive gear.

11. The transmission device according to claim 8, wherein:

said torque transmitting capacity variable means comprises a viscous coupling.

12. The transmission device according to claim 8, wherein:

said torque transmitting capacity variable means comprises a hydraulic multiple disk clutch.

13. The transmission device according to claim 10, further comprising:

an oil pump driven by said engine and mounted on said partition wall for generating a hydraulic pressure to operate said hydraulic multiple disk clutch.

* * * * *